S. B. ROSE.
SHEARS.
APPLICATION FILED APR. 10, 1914.

1,176,319.

Patented Mar. 21, 1916.

Witnesses
R. A. Boswell
J. W. Sherwood

Inventor
S. B. Rose,
By Franklin H. Hough
Attorney

UNITED STATES PATENT OFFICE.

SOLOMAN B. ROSE, OF WILEYVILLE, WEST VIRGINIA.

SHEARS.

1,176,319.     Specification of Letters Patent.     Patented Mar. 21, 1916.

Application filed April 10, 1914. Serial No. 831,065.

*To all whom it may concern:*

Be it known that I, SOLOMAN B. ROSE, a citizen of the United States, residing at Wileyville, in the county of Wetzel and State of West Virginia, have invented certain new and useful Improvements in Shears; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in shears for cutting tin, etc., and comprises a simple and efficient device of this nature having various details of construction, combinations and arrangements of parts which will be hereinafter fully described, shown in the accompanying drawings and then specifically defined in the appended claim.

Figure 1:
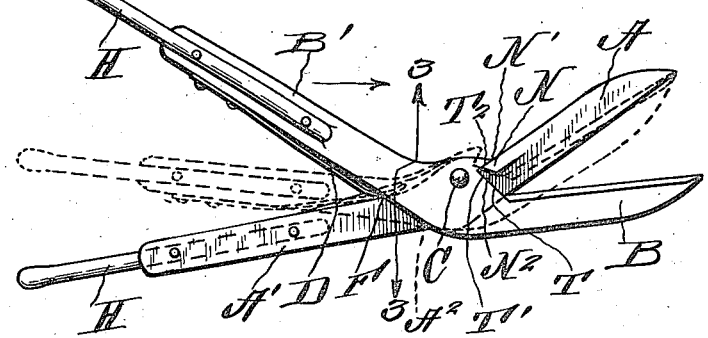
Figure 2:
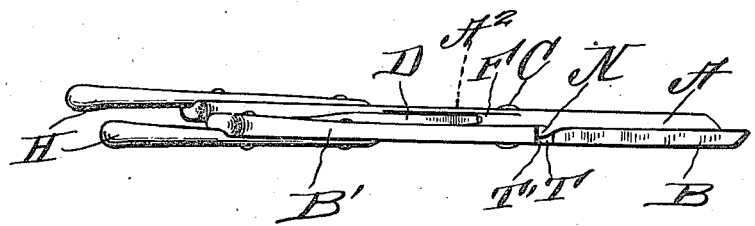
Figure 3:
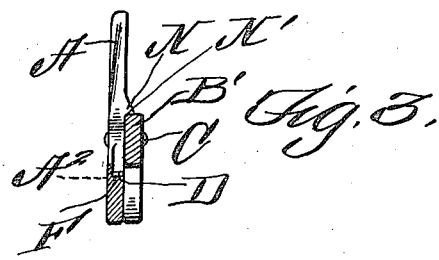

My invention is illustrated in the accompanying drawings, in which:

Figure 1 is a side elevation of the shears. Fig. 2 is an edge view, and Fig. 3 is a sectional view.

Reference now being had to the details of the drawings by letter, A and B designate the jaws of the shears, the jaw A having a shank A' which is bent at an angle at $A^2$, and B' designates the shank of the jaw B. A pivotal pin C passes through registering apertures in the two shank portions, preferably at one side of the longitudinal center, thereby giving a drawing, shearing cut to the edges of the jaws. A spring D is fastened to the shank portion of the jaw B' and its free end, which is curved, has a frictional sliding contact with the bottom of a recess F formed in the inner edge of the shank portion A', the tendency of said spring being to open the jaws after having been closed.

Handles, designated by letter H, which may be of different lengths as may be desired, are fastened to the shank portions of the jaws in any suitable manner. Upon the inner face of the jaw A is a projection N having two contact edges N' and $N^2$ and the shank portion B' is provided with a recess T formed near the inner end of the blade thereof, the bottom wall T' and the end wall $T^2$ of said recess being adapted to contact respectively with the two contact edges $N^2$ and N' respectively to limit the movements of the jaws in opposite directions.

By the provision of shears made in accordance with my invention, I have found that a tin or other sheet may be cut without twisting the edges into different shapes and efficient shears are afforded for use not only in cutting tin but for pruning and other purposes.

What I claim to be new is:

Cutting shears made up of two blades with shank portions which are angled, the shearing edge of one blade terminating at its inner end in an inclined portion of the shank which extends in advance of the cutting edge and the inner end of the cutting edge of the other blade extending rearward of said inclined portion, the two shank portions of the blades provided with registering and eccentrically formed apertures which are at one side of the cutting edges when the blades are closed, one blade having a laterally extending lug adapted to contact with the inclined projection of the shank of the other blade to limit the inner shearing movements of the blade, a spring fastened to the shank of one blade and bearing against the edge of the shank of the other blade adjacent to the pivotal points of the blades.

In testimony whereof I hereunto affix my signature in presence of two witnesses.

SOLOMAN B. ROSE.

Witnesses:
  LEWIS SHARP,
  LAURA MCALLISTER.